(12) United States Patent
Overberg

(10) Patent No.: US 6,395,380 B1
(45) Date of Patent: May 28, 2002

(54) METHOD FOR FIXING A FABRIC TO A STRUCTURAL PART

(75) Inventor: Matthias Overberg, Heimerdingen (DE)

(73) Assignee: Micro Compact Car Smart GmbH, Renningen (DE)

(*) Notice: Subject to any disclaimer, the term of this patent is extended or adjusted under 35 U.S.C. 154(b) by 0 days.

(21) Appl. No.: 09/554,758

(22) PCT Filed: Oct. 24, 1998

(86) PCT No.: PCT/EP98/06762

§ 371 (c)(1),
(2), (4) Date: Jul. 18, 2000

(87) PCT Pub. No.: WO99/25539

PCT Pub. Date: May 27, 1999

(30) Foreign Application Priority Data

Nov. 19, 1997 (DE) ......................................... 197 51 192

(51) Int. Cl.⁷ .................................................. B32B 7/08
(52) U.S. Cl. ..................... 428/223; 428/137; 428/139; 428/140; 428/62; 428/58; 428/60; 428/63; 156/515; 156/514; 156/513; 156/512; 156/250; 156/257

(58) Field of Search .......................... 428/57, 139, 140, 428/137, 60, 63, 62, 58; 156/515, 514, 513, 512, 510, 211, 212, 213, 221, 250, 251, 257, 260

(56) References Cited

U.S. PATENT DOCUMENTS 4,532,166 A * 7/1985 Thomsen et al. ............. 428/57

* cited by examiner

*Primary Examiner*—Merrick Dixon
(74) *Attorney, Agent, or Firm*—Crowell & Moring LLP

(57) ABSTRACT

A method for attaching fabric to a structural part. The structural part is at least partially surrounded by fabric at least on one side. The structural part, which is provided with holes, is surrounded by the fabric at least in the region of the holes on both hole-opening sides. Fabric pieces on one side are inserted through the holes and are connected to the fabric of the other side in the region of the hole openings by bonding or welding.

14 Claims, 1 Drawing Sheet

METHOD FOR FIXING A FABRIC TO A STRUCTURAL PART

BACKGROUND AND SUMMARY OF THE INVENTION

The invention relates to a method for attaching fabric to a structural part.

U.S. Pat. No. 4,684,419 discloses a method for attaching a cabriolet folding-top fabric. In this case, attachment to a three-dimensional structural parts takes place by means of an adhesive plus covering strip, or by means of a positive connection with retaining strips plus screws or rivets. In this case, the fabric is placed around additional profiles, for example strips, or the fabric is welded to form pockets which are slid over the structural part. The fabric is then connected to the structural part by the strips plus screws or rivets.

The connection of fabric to a structural part has hitherto been produced in practice by means of a mechanical connection. This is done via clamps, via strips or via insertions. Connection of fabric to a three-dimensional structural part by welding or bonding has hitherto not been operationally reliable in engineering terms because of the unavoidable tolerances of a structural part, in particular of plastic.

The present invention is therefore based on the object of providing a method and a connection for attaching fabric to a three-dimensional structural part.

The method according to the invention creates a connection between the fabric and the structural part, which connection can be carried out irrespective of the material of the structural part and therefore also irrespective of the tolerances thereof. Even the environmental conditions and different tolerances at different temperatures are not of importance in the case of the connection produced by this process. Because the tolerances of the structural part do not have to be taken into consideration, the fabrics can be connected to the structural part by means of 3-D-welding (HF-welding) or by means of 3-D-bonding (HF-bonding).

The holes placed in the structural part make it possible for fabric to be welded or bonded onto fabric.

BRIEF DESCRIPTION OF THE DRAWINGS

An exemplary embodiment of the invention is described with reference to the drawing, in which.

DETAILED DESCRIPTION OF THE DRAWINGS

Figure 1:
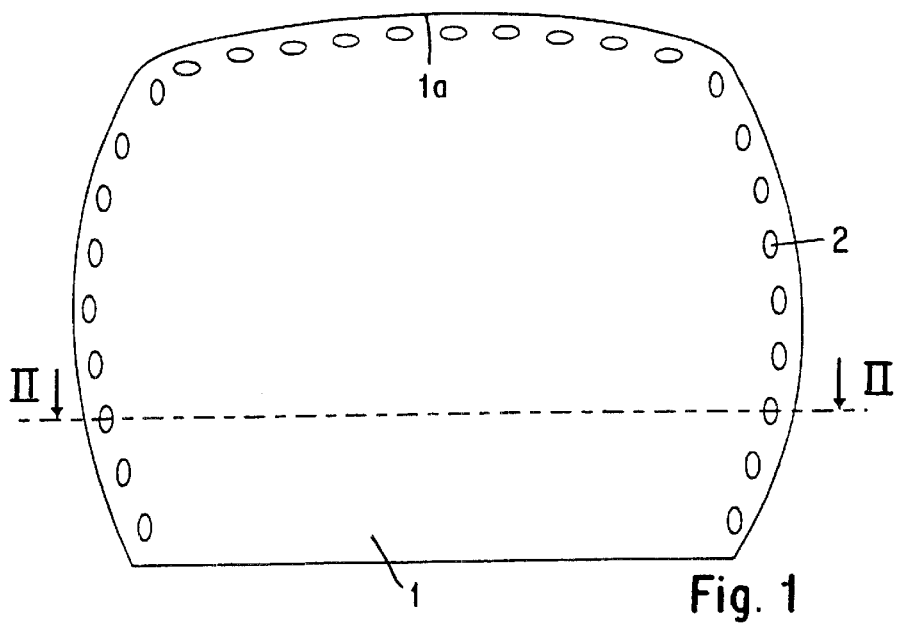
FIG. 1 shows a plan view of a structural part according to the invention.

FIG. 1 shows a structural part as is used, for example, in folding tops of cabriolets. This structural part 1 is provided with a multiplicity of holes 2 on its edge region.

Figure 2:
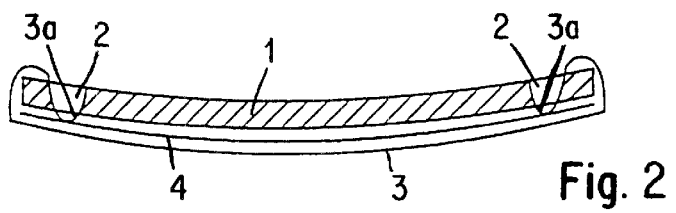
FIG. 2 shows a section through a structural part according to the invention following the line II—II of FIG. 1.

As can be seen in FIG. 2, for example on the upper side, the structural part 1 is entirely surrounded by fabric 3 on one of its surfaces. At a front edge 1a of the structural part 1, the fabric 3 is bent over and brought back again on the lower side of the structural part 1. On the lower side of the structural part 1, the fabric 3 is inserted in the manner of a saw tooth into the holes 2 of the structural part 1, with a multiplicity of fabric pieces 3a protruding. The fabric pieces 3a are of a sufficient size that they fit into the holes 2. The fabric pieces 3a are inserted through the holes 2 and are connected to the rear side of the fabric 3 of the other side by means of HF-welding or HF-bonding.

A welding auxiliary 4 may, if required, be placed between the structural part 1 and the fabric 3. The welding auxiliary 4, which is illustrated in FIG. 2, is used to connect the fabric pieces 3a to the fabric 3 if they cannot be directly welded or bonded together. This may, for example, be the case if in the fabric 3 and the fabric pieces 3a the textile sides meet. In this case, a welding auxiliary 4 has to be placed along the welding points between the fabric 3 and the fabric pieces 3a. The HF-welding causes the welding auxiliary 4 to fuse together with the fabric 3 and the fabric pieces 3a.

The holes 2 may be provided with a bevelled portion. This bevelled portion prevents folds or cracks from forming after the fabric pieces 3a have been folded around and introduced into the holes 2. These folds or cracks in the fabric could lead to leakage. A more reliable operation is obtained by means of this bevelling.

As can be seen from FIG. 1, the holes 2 can be placed at regular or irregular intervals in the edge region of the structural part 1. The structural part 1 may be designed as a roof ridge, a bow, a clamping collar or a roof frame in cabriolets.

Figure 3:
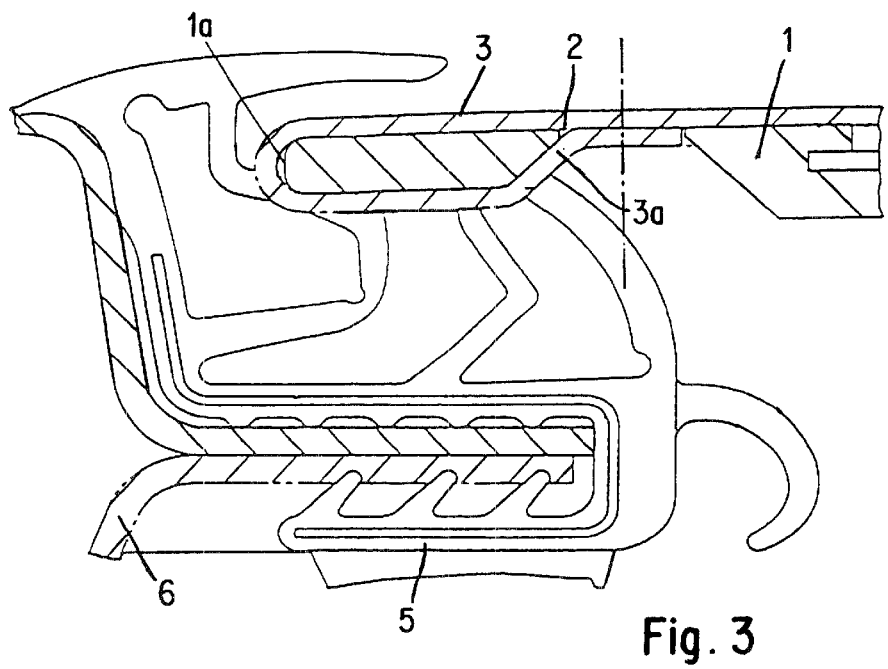
FIG. 3 shows a section through a structural part in the closed state of a cabriolet folding top.

FIG. 3 shows the structural part 1 in the closed state of a cabriolet folding top with a weatherseal 5 and a vehicle body 6. In this case, the fabric 3 is situated on that side of the structural part 1 which faces away from the weatherseal 5. The fabric 3 is wound around the structural part 1 in such a manner that there are fabric pieces 3a on that side of the structural part 1 which faces the weatherseal. The fabric pieces 3a surround the holes 2 of the structural part 1. The fabric parts 3, 3a are connected to one another through the holes 2 with the aid of the appropriate HF-welding or HF-bonding tool.

The structural part 1 can consist of different material. The material selected has no effect on the HF-welding or HF-bonding, since in each case fabric is only connected to fabric. As a result, possible fluctuations in tolerance in the selected material of the structural part 1 do not have any effect on the attaching of the fabric 3 either.

The method according to the invention may, of course, be used in all spheres where fabrics 3, 3a have to be connected to structural parts 1.

What is claimed is:

1. A method for attaching fabric to a structural part, comprising:

surrounding a structural part having holes with a fabric on first and second hole-opening sides of the structural part at least in a region of the holes;

bringing a plurality of fabric pieces from the first hole-opening side through the holes to the second hole-opening side; and connecting the plurality of fabric pieces on the second hole-opening side to the fabric by bonding or welding.

2. A method according to claim 1, wherein the fabric is a folding-top fabric of a vehicle.

3. A method according to claim 1, wherein said connecting is by HF-welding or HF-bonding.

4. A method according to claim 1, wherein said connecting is by welding the plurality of fabric pieces to one side of a welding auxiliary and the fabric to another side of the welding auxiliary located between the plurality of fabric pieces and the fabric.

5. A method for attaching fabric to a structural part, comprising:

covering a first side of a structural part with a fabric, said structural part having a plurality of holes;

bringing the fabric over an edge of the structural part to a second side of the structural part;

inserting a plurality of fabric pieces from the second side of the structural part through the holes to the first side of the structural part; and connecting the plurality of fabric pieces to the fabric covering the first side of the structural part by bonding or welding.

6. A method according to claim 5, further comprising placing an a welding auxiliary between the fabric and the first side of the structural part and wherein said connecting comprises welding the plurality of fabric pieces to one side of the welding auxiliary.

7. A method for attaching fabric to a structural part, comprising:

covering a first side of a structural part with a fabric, said structural part having a plurality of holes;

bringing the fabric to a second side of the structural part;

inserting a plurality of fabric pieces from the second side through the holes to the first side of the structural part so that the plurality of fabric pieces protrude from the first side of the structural part; and connecting the plurality of protruding fabric pieces to the fabric covering the first side of the structural part by bonding or welding.

8. A connection of fabric to a structural part, comprising:

a structural part having a plurality of holes;

a fabric that surrounds the structural part at least in a region of the plurality of holes on first and second hole-opening sides of the structural part;

wherein the fabric comprises fabric pieces on at least one side of the structural part;

wherein the fabric pieces are connected to the fabric on the other side of the structural part through the holes.

9. A connection of fabric according to claim 8, wherein the fabric is a folding-top fabric of a vehicle.

10. A connection according to claim 8, wherein the plurality of holes have a bevelled portion at least on a first hole-opening side through which the fabric pieces are connected to the fabric on the other side of the structural part.

11. A connection according to claim 8, wherein the plurality of holes are at regular intervals in an edge region of the structural part.

12. A connection according to claim 8, wherein the structural part is selected from the group consisting of a roof ridge, a bow, a clamping collar, and a roof frame.

13. A connection of fabric to a structural part, comprising:

a structural part having a plurality of holes; and a fabric that surrounds a first side of the structural part at least in a region of the plurality of holes, wherein the fabric extends to a second side of the structural part and a plurality of fabric pieces are inserted from the second side through the plurality of holes to the first side of the structural part and are connected to the fabric on the first side of the structural part.

14. A connection according to claim 13, wherein the plurality of fabric pieces are connected to a rear side of the fabric on the first side of the structural part.

* * * * *